United States Patent
Kwon et al.

(10) Patent No.: US 10,613,767 B2
(45) Date of Patent: Apr. 7, 2020

(54) NON-VOLATILE MEMORY SYSTEM

(71) Applicants: The-AiO Inc., Gyeonggi-do (KR); ESSENCORE Limited, Hongkong (CN)

(72) Inventors: Seok Cheon Kwon, Gyeonggi-do (KR); Seung Hyun Han, Seoul (KR)

(73) Assignees: The-AiO Inc., Gyeonggi-Do (KR); Essencore Limited, Hong Kong (CN)

( * ) Notice: Subject to any disclaimer, the term of this patent is extended or adjusted under 35 U.S.C. 154(b) by 48 days.

(21) Appl. No.: 15/983,176

(22) Filed: May 18, 2018

(65) Prior Publication Data
US 2019/0354293 A1  Nov. 21, 2019

(30) Foreign Application Priority Data

May 16, 2018 (KR) .......................... 10-2018-0055712

(51) Int. Cl.
*G06F 12/00* (2006.01)
*G06F 3/06* (2006.01)
*G06F 12/02* (2006.01)

(52) U.S. Cl.
CPC .......... *G06F 3/0616* (2013.01); *G06F 3/064* (2013.01); *G06F 3/0658* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 2008/0282045 A1* | 11/2008 | Biswas | G06F 12/0246 711/159 |
| 2010/0235605 A1 | 9/2010 | Perry et al. | |
| 2011/0099326 A1 | 4/2011 | Jung et al. | |

OTHER PUBLICATIONS

Office Action dated Jun. 12, 2019 from corresponding Taiwanese Patent Application No. 107117292.

* cited by examiner

*Primary Examiner* — Daniel D Tsui
(74) *Attorney, Agent, or Firm* — Blank Rome LLP (57) ABSTRACT

A non-volatile memory system includes a NAND flash memory device including at least one NAND flash memory and a memory controller that controls the NAND flash memory, a host device including a file system and a host controller that receives a command from the file system to provide the command to the NAND flash memory device, and a save storage manager that monitors a number and location of run-time bad blocks in the NAND flash memory, monitors a logical address use-state of the file system, and reduces a logical address space which the file system is able to use as the number of the run-time bad blocks is increased.

9 Claims, 7 Drawing Sheets

NON-VOLATILE MEMORY SYSTEM

CROSS-REFERENCE TO RELATED APPLICATION(S)

This application claims priority under 35 USC § 119 to Korean Patent Application No. 10-2018-0055712, filed on May 16, 2018 in the Korean Intellectual Property Office (KIPO), the contents of which are incorporated herein in its entirety by reference.

BACKGROUND

1. Technical Field

Exemplary embodiments relate generally to a semiconductor memory system. More particularly, embodiments of the present inventive concept relate to a non-volatile memory system including a host device and a NAND flash memory device.

2. Description of the Related Art

A semiconductor memory device may be classified into two types (i.e., a volatile memory device and a non-volatile memory device) according to whether data can be retained when power is not supplied. Recently, a NAND flash memory device is widely used as the non-volatile memory device because the NAND flash memory device can be manufactured smaller in size while having higher capacity at low cost. Generally, the NAND flash memory device performs a write operation and a read operation in a page unit and performs an erase operation in a block unit. Thus, the NAND flash memory device performs the write operation, the read operation, the erase operation, a garbage collection operation (or, a reclaim operation), a wear leveling operation, and the like on a NAND flash memory using a memory controller that includes a flash translation layer (FTL) for supporting a file system of a host device. Here, the flash translation layer performs an address mapping operation based on a mapping table that stores mapping information between logical addresses and physical addresses.

Because blocks of the NAND flash memory are deteriorated (or, degraded) as the write operation and the erase operation are repeatedly performed on the blocks, the flash translation layer prevents the NAND flash memory device from malfunctioning by replacing a run-time bad block (i.e., a block in which a defect occurs due to the deterioration or in which a defect is expected to occur due to the deterioration) with a reserved block or by retiring the run-time bad block (i.e., by excluding the run-time bad block from use) after moving valid data of the run-time bad block to at least one free block. Here, a usable physical address space in the NAND flash memory device is reduced as the number of the run-time bad blocks is increased in the NAND flash memory. Thus, when the NAND flash memory device is unable to provide a sufficient logical address space to the host device, it is determined that the NAND flash memory device reaches its end of life (EOL), so that the NAND flash memory device may be discarded. However, even when the NAND flash memory device is unable to provide the sufficient logical address space to the host device, it is common that the host device use only a portion of an entire logical address space provided by the NAND flash memory device. Thus, although the number of the run-time bad blocks is increased by a given number or more in the NAND flash memory, unconditionally discarding the NAND flash memory device including the NAND flash memory may waste unnecessary resources.

SUMMARY

Some exemplary embodiments provide a non-volatile memory system including a host device and a NAND flash memory device that can use the NAND flash memory device without malfunctioning of the NAND flash memory device even when the NAND flash memory device is unable to provide a sufficient logical address space to the host device (i.e., even when it is determined that the NAND flash memory device reaches its EOL) as the number of run-time bad blocks is increased in a NAND flash memory of the NAND flash memory device.

According to an aspect of exemplary embodiments, a non-volatile memory system may include a NAND flash memory device including at least one NAND flash memory and a memory controller that controls the NAND flash memory, a host device including a file system and a host controller that receives a command from the file system to provide the command to the NAND flash memory device, and a save storage manager configured to monitor a number and location of run-time bad blocks in the NAND flash memory, to monitor a logical address use-state of the file system, and to reduce a logical address space which the file system is able to use as the number of the run-time bad blocks is increased.

In exemplary embodiments, the save storage manager may be included in the host controller or the memory controller. Here, the save storage manager may interact with the file system and a flash translation layer included in the memory controller.

In exemplary embodiments, the save storage manager may control the file system to recall a portion of first logical addresses which the file system does not use to reduce the logical address space.

In exemplary embodiments, the save storage manager may control the file system to reallocate (or, rearrange) the first logical addresses to be consecutive by performing a defragmentation operation on second logical addresses which the file system uses before recalling the portion of the first logical addresses.

In exemplary embodiments, the save storage manager may control the file system to generate at least one dummy file that occupies a portion of first logical addresses which the file system does not use to reduce the logical address space.

In exemplary embodiments, the save storage manager may control the memory controller to replace the run-time bad blocks with reserved blocks in the NAND flash memory when the logical address space is reduced.

In exemplary embodiments, the save storage manager may control the file system to reduce the logical address space whenever the number of the run-time bad blocks is greater than a reference number. Here, the save storage manager may increase the reference number as the NAND flash memory device is used.

In exemplary embodiments, the reserved blocks may be set when the NAND flash memory device is manufactured. Here, the reserved blocks may not be added as the NAND flash memory device is used.

In exemplary embodiments, the reserved blocks may be set when the NAND flash memory device is manufactured. Here, the reserved blocks may be added by converting a portion of free blocks into the reserved blocks in the NAND flash memory as the NAND flash memory device is used.

In exemplary embodiments, the save storage manager may control the memory controller to retire the run-time bad blocks in the NAND flash memory when the logical address space is reduced.

In exemplary embodiments, the save storage manager may control the memory controller to move (or, copy) valid data of the run-time bad blocks to free blocks before retiring the run-time bad blocks in the NAND flash memory.

In exemplary embodiments, the save storage manager may control the file system to reduce the logical address space whenever the number of the run-time bad blocks is greater than a reference number. Here, the save storage manager may increase the reference number as the NAND flash memory device is used.

According to another aspect of exemplary embodiments, a NAND flash memory device may include at least one NAND flash memory and a memory controller configured to control the NAND flash memory. Here, the memory controller may include a save storage manager configured to monitor a number and location of run-time bad blocks in the NAND flash memory, to monitor a logical address use-state of a file system included in a host device, and to reduce a logical address space which the file system is able to use as the number of the run-time bad blocks is increased.

According to still another aspect of exemplary embodiments, a host device may include a file system and a host controller configured to receive a command from the file system to provide the command to a NAND flash memory device. Here, the host controller may include a save storage manager configured to monitor a number and location of run-time bad blocks in at least one NAND flash memory included in the NAND flash memory device, to monitor a logical address use-state of the file system, and to reduce a logical address space which the file system is able to use as the number of the run-time bad blocks is increased.

Therefore, a non-volatile memory system according to exemplary embodiments may include a NAND flash memory device including a NAND flash memory and a memory controller that controls the NAND flash memory and a host device including a file system and a host controller that receives a command from the file system to provide the command to the NAND flash memory device. Here, the non-volatile memory system may use the NAND flash memory device without malfunctioning of the NAND flash memory device by including a save storage manager in the host device or the NAND flash memory device even when the NAND flash memory device is unable to provide a sufficient logical address space to the host device (i.e., even when it is determined that the NAND flash memory device reaches its EOL) as the number of run-time bad blocks is increased in the NAND flash memory, where the save storage manager monitors the number and location of the run-time bad blocks in the NAND flash memory, monitors a logical address use-state of the file system, and reduces a logical address space which the file system is able to use as the number of the run-time bad blocks is increased in the NAND flash memory.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
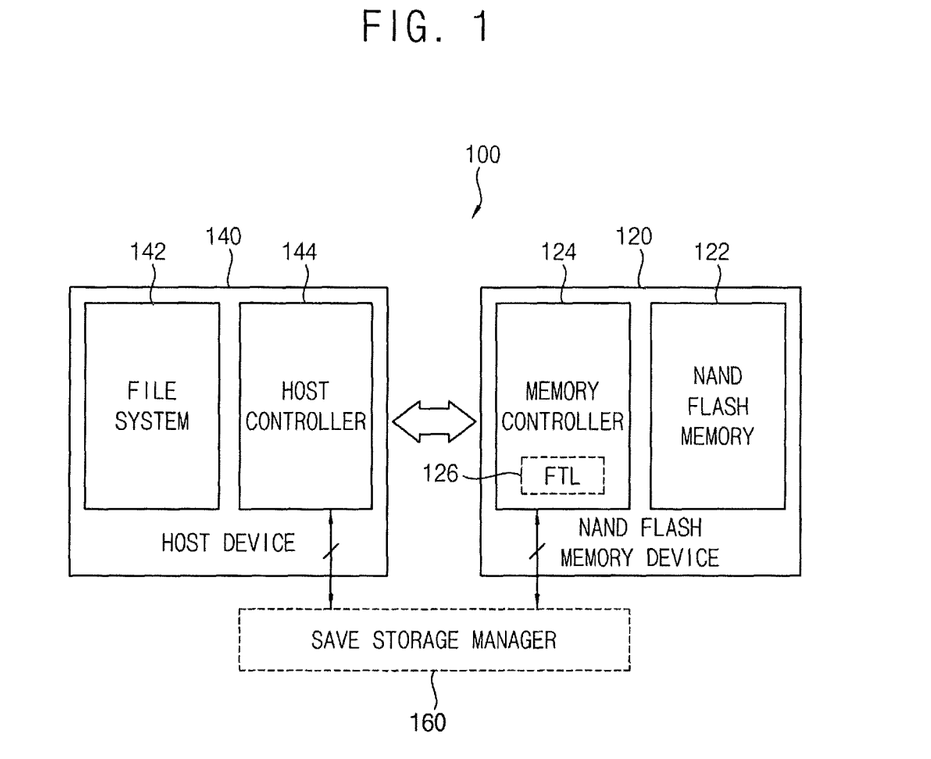
FIG. 1 is a block diagram illustrating a non-volatile memory system according to exemplary embodiments.
Figure 2A:
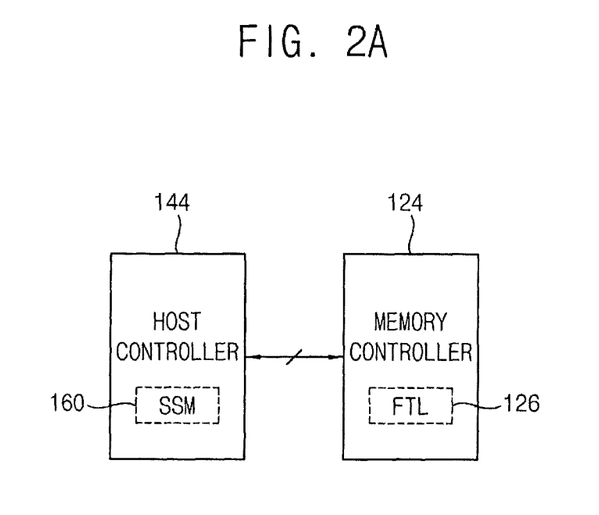
FIG. 2A is a diagram illustrating an example in which a save storage manager is included in a host device in the non-volatile memory system of FIG. 1.
Figure 2B:
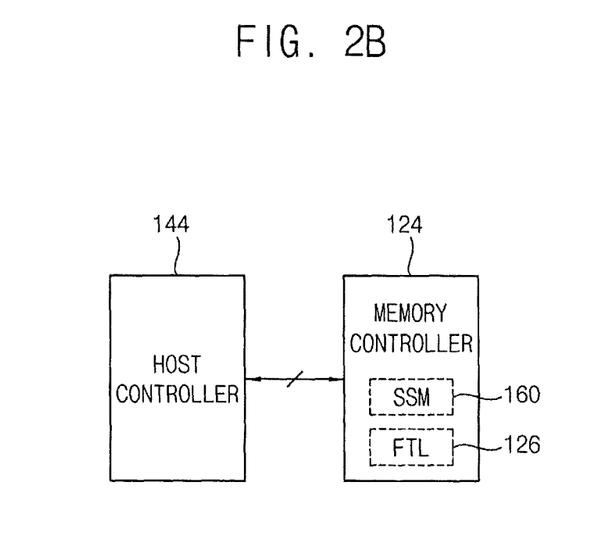
FIG. 2B is a diagram illustrating an example in which a save storage manager is included in a NAND flash memory device in the non-volatile memory system of FIG. 1.

FIG. 1 is a block diagram illustrating a non-volatile memory system according to exemplary embodiments, FIG. 2A is a diagram illustrating an example in which a save storage manager is included in a host device in the non-volatile memory system of FIG. 1, and FIG. 2B is a diagram illustrating an example in which a save storage manager is included in a NAND flash memory device in the non-volatile memory system of FIG. 1.

Referring to FIGS. 1 to 2B, the non-volatile memory system 100 may include a NAND flash memory device 120 and a host device 140. Here, the non-volatile memory system 100 may further include a save storage manager 160 that is included (or, implemented) in the NAND flash memory device 120 or the host device 140.

The NAND flash memory device 120 may include at least one NAND flash memory 122 and a memory controller 124 that controls the NAND flash memory 122. For convenience of description, although it is illustrated in FIG. 1 that the NAND flash memory device 120 includes one NAND flash memory 122, the NAND flash memory device 120 may include a plurality of NAND flash memories 122. The host device 140 may include a file system 142 and a host controller 144 that receives a command from the file system 142 to provide the command to the NAND flash memory device 120. Generally, as compared to a random access memory device (e.g., a dynamic random access memory (DRAM) device, etc), the NAND flash memory device 120 has limits to perform a write operation, a read operation, and an erase operation on memory cells included in the NAND flash memory 122 due to a physical structure of the NAND flash memory 122. Specifically, due to physical structure of the NAND flash memory 122, the NAND flash memory device 120 performs the write operation and the read operation in a page unit on the memory cells included in the NAND flash memory 122 and performs the erase operation in a block unit on the memory cells included in the NAND flash memory 122. Thus, the NAND flash memory device 120 performs the write operation, the read operation, the erase operation, a merge operation, a copyback operation, a compaction operation, a garbage collection operation (or, a reclaim operation), a wear leveling operation, and the like on the NAND flash memory 122 using the memory controller 124 that includes a flash translation layer 126 for supporting the file system 142 of the host device 140. In other words, the memory controller 124 performs the above operations by executing the flash translation layer 126 that is implemented by software. Here, the flash translation layer 126 performs an address mapping operation based on a mapping table that stores mapping information between logical addresses and physical addresses. That is, the flash translation layer 126 may translates the logical addresses recognized by the host device 140 (i.e., the file system 142) into the physical addresses of the NAND flash memory device 120.

Generally, as the write operation and the erase operation are repeatedly performed on blocks of the NAND flash memory 122 in the NAND flash memory device 120, the blocks (i.e., the memory cells included in the blocks) are deteriorated. Here, because each memory cell composing the NAND flash memory 122 has a limited lifetime, a block may not operate normally when the block (i.e., the memory cells included in the block) reaches its end of life (EOL) as the write operation and the erase operation are performed more than a given number of times. Thus, the flash translation layer 126 prevents the NAND flash memory device 120 from malfunctioning by replacing a run-time bad block (i.e., a block in which a defect occurs due to the deterioration or in which a defect is expected to occur due to the deterioration) with a reserved block or by retiring the run-time bad block (i.e., by excluding the run-time bad block from use) after moving valid data of the run-time bad block to at least one free block. Here, a usable physical address space in the NAND flash memory device 120 is reduced as the number of the run-time bad blocks is increased in the NAND flash memory 122. Thus, when the NAND flash memory device 120 is unable to provide a sufficient logical address space to the host device 140, it is determined that the NAND flash memory device 120 reaches its EOL, so that the NAND flash memory device 120 may be discarded. However, it is uncommon that the host device 140 uses an entire logical address space provided by the NAND flash memory device 120. Thus, when the host device 140 uses only a portion of the entire logical address space provided by the NAND flash memory device 120, it is undesirable to unconditionally discard the NAND flash memory device 120 based on determination that the number of the run-time bad blocks is increased by a given number or more in the NAND flash memory 122.

For this reason, the non-volatile memory system 100 may use the NAND flash memory device 120 without malfunctioning of the NAND flash memory device 120 by reducing a logical address space which the file system 142 of the host device 140 is able to use when the NAND flash memory device 120 is unable to provide a sufficient logical address space to the host device 140 (i.e., when it is determined that the NAND flash memory device 120 reaches its EOL) as the number of the run-time bad blocks is increased in the NAND flash memory 122. To this end, the non-volatile memory system 100 may include the save storage manager 160 that monitors the number and location of the run-time bad blocks in the NAND flash memory 122 of the NAND flash memory device 120, monitors a logical address use-state of the file system 142 of the host device 120, and reduces the logical address space which the file system 142 of the host device 140 is able to use as the number of the run-time bad blocks is increased in the NAND flash memory 122. In exemplary embodiments, the save storage manager 160 may be implemented by software. The save storage manager 160 may interact with the file system 142 of the host device 140 and the flash translation layer 160 included (or, implemented) in the memory controller 124 of the NAND flash memory device 120. In an exemplary embodiment, as illustrated in FIG. 2A, the save storage manager 160 may be included in the host controller 144 of the host device 120. In this case, the save storage manager 160 may interact with the file system 142 more easily. In another exemplary embodiment, as illustrated in FIG. 2B, the save storage manager 160 may be included in the memory controller 124 of the NAND flash memory device 120. In this case, the save storage manager 160 may interact with the flash translation layer 126 included in the memory controller 124 more easily.

The save storage manager 160 may monitor the number and the location of the run-time bad blocks in the NAND flash memory 122 of the NAND flash memory device 120. In an exemplary embodiment, the save storage manager 160 may include a table that stores information relating to the number and the location of the run-time bad blocks. Here, the table may further include information relating to the number and location of free blocks, information relating to the number and location of reserved blocks, etc as well as the information relating to the number and the location of the run-time bad blocks. In addition, the save storage manager 160 may monitor the logical address use-state of the file system 142 of the host device 140 (e.g., may trace a logical block address (LBA) allocation history). In an exemplary embodiment, the save storage manager 160 may include a table that stores information relating to the logical address use-state of the file system 142 of the host device 140. Furthermore, the save storage manager 160 may reduce the logical address space which the file system 142 of the host device 140 is able to use as the number of the run-time bad blocks is increased in the NAND flash memory 122 of the NAND flash memory device 120. In other words, when the NAND flash memory device 120 cannot provide an original logical address space to the host device 140 (i.e., when the NAND flash memory device 120 cannot physically support the original logical address space for the host device 140) as the number of the run-time bad blocks is increased in the NAND flash memory 122, the save storage manager 160 may reduce the logical address space which the host device 140 (i.e., the file system 142) is able to use by recalling an unused logical address space which the host device 140 (i.e., the file system 142) does not use or by generating at least one dummy file which occupies the unused logical address space. Here, the save storage manager 160 may inform the NAND flash memory device 120 of a reduction of the logical address space to make the NAND flash memory device 120 handle the run-time bad blocks. As described above, since the save storage manager 160 reduces the logical address space for the host device 140, which the NAND flash memory device 120 is required to physically support, the NAND flash memory device 120 may operate normally even when the run-time bad blocks are replaced with the reserved blocks or even when the run-time bad blocks are retired.

In an exemplary embodiment, the save storage manager 160 may reduce the logical address space which the file system 142 is able to use by controlling the file system 142 to recall a portion of the first logical addresses which the file system 142 does not use (i.e., the unused logical address space). In other words, when the NAND flash memory device 120 cannot physically support the original logical address space for the host device 140 as the number of the run-time bad blocks is increased in the NAND flash memory 122, the save storage manager 160 may reduce the logical address space which the file system 142 is able to use by recalling a portion of the first logical addresses. This embodiment will be described in detail with reference to FIG. 3. In another exemplary embodiment, the save storage manager 160 may reduce the logical address space which the file system 142 is able to use by controlling the file system 142 to perform a defragmentation operation on second logical addresses which the file system 142 uses (i.e., a used logical address space) to reallocate (or, rearrange) the first logical addresses which the file system 142 does not use (i.e., the unused logical address space) to be consecutive and then by controlling the file system 142 to recall a portion of the first logical addresses. In other words, when the NAND flash memory device 120 cannot physically support the original logical address space for the host device 140 as the number of the run-time bad blocks is increased in the NAND flash memory 122, the save storage manager 160 may reduce the logical address space which the file system 142 is able to use by recalling a portion of the first logical addresses after performing the defragmentation operation on the second logical addresses to reallocate the first logical addresses to be consecutive. This embodiment will be described in detail with reference to FIG. 4. In still another exemplary embodiment, the save storage manager 160 may reduce the logical address space which the file system 142 is able to use by controlling the file system 142 to generate at least one dummy file that occupies a portion of the first logical addresses which the file system 142 does not use (i.e., the unused logical address space). In other words, when the NAND flash memory device 120 cannot physically support the original logical address space for the host device 140 as the number of the run-time bad blocks is increased in the NAND flash memory 122, the save storage manager 160 may reduce the logical address space which the file system 142 is able to use by allocating at least one dummy file to a portion of the first logical addresses. This embodiment will be described in detail with reference to FIG. 5.

The save storage manager 160 may determine, in various ways, whether to reduce the logical address space which the file system 142 is able to use. In an exemplary embodiment, the reserved blocks may be set when the NAND flash memory device 120 is manufactured, and the reserved blocks may not be added as the NAND flash memory device 120 is used. In this case, the save storage manager 160 may control the file system 142 to reduce the logical address space which the file system 142 is able to use whenever the number of the run-time bad blocks included in the NAND flash memory 122 is greater than a reference number. Here, the save storage manager 160 may increase the reference number as the NAND flash memory device 120 is used. In addition, the save storage manager 160 may control the memory controller 124 to replace the run-time bad blocks with the reserved blocks in the NAND flash memory 122. This embodiment will be described in detail with reference to FIG. 6. In another exemplary embodiment, the reserved blocks may be set when the NAND flash memory device 120 is manufactured, and the reserved blocks may be added by converting a portion of the free blocks into the reserved blocks in the NAND flash memory 122 as the NAND flash memory device 120 is used. In this case, the save storage manager 160 may control the file system 142 to reduce the logical address space which the file system 142 is able to use whenever the number of the run-time bad blocks included in the NAND flash memory 122 is greater than a reference number. Here, the save storage manager 160 may increase the reference number as the NAND flash memory device 120 is used. In addition, the save storage manager 160 may control the memory controller 124 to replace the run-time bad blocks with the reserved blocks in the NAND flash memory 122. This embodiment will be described in detail with reference to FIG. 7. In still another exemplary embodiment, the NAND flash memory device 120 may not employ a reserved block replacement technique. That is, the reserved blocks may not be set when the NAND flash memory device 120 is manufactured. In this case, the save storage manager 160 may control the file system 142 to reduce the logical address space which the file system 142 is able to use whenever the number of the run-time bad blocks included in the NAND flash memory 122 is greater than a reference number. Here, the save storage manager 160 may increase the reference number as the NAND flash memory device 120 is used. In addition, the save storage manager 160 may control the memory controller 124 to move the valid data of the run-time bad blocks to the free blocks and then to retire the run-time bad blocks (i.e., to exclude the run-time bad blocks from use) in the NAND flash memory 122. This embodiment will be described in detail with reference to FIG. 8.

In brief, the non-volatile memory system 100 may include the NAND flash memory device 120 including the NAND flash memory 122 and the memory controller 124 that controls the NAND flash memory 122 and the host device 140 including the file system 142 and the host controller 144 that receives the command from the file system 142 to provide the command to the NAND flash memory device 120. Here, the non-volatile memory system 100 may use the NAND flash memory device 120 without malfunctioning of the NAND flash memory device 120 by including the save storage manager 160 in the host device 140 or the NAND flash memory device 120 even when the NAND flash memory device 120 is unable to provide a sufficient logical address space to the host device 140 (i.e., even when it is determined that the NAND flash memory device 120 reaches its EOL) as the number of the run-time bad blocks is increased in the NAND flash memory 122, where the save storage manager 160 monitors the number and the location of the run-time bad blocks in the NAND flash memory 122, monitors the logical address use-state of the file system 142, and reduces the logical address space which the file system 142 is able to use as the number of the run-time bad blocks is increased in the NAND flash memory 122. In an exemplary embodiment, the NAND flash memory device 120 included in the non-volatile memory system 100 may be implemented as an embedded multi media card (eMMC). In this case, an operation of the save storage manager 160 for reducing the logical address space which the file system 142 is able to use may be associated with a partition size adjustment function, an eMMC dynamic capacity function, a vendor command function, etc. However, the implementation of the NAND flash memory device 120 is not limited thereto. For example, the NAND flash memory device 120 may be implemented as a solid state drive (SSD), a secure digital (SD) card, a universal flash storage (UFS), a compact flash (CF) card, a memory stick, an extreme digital (XD) picture card, etc.

Figure 3:
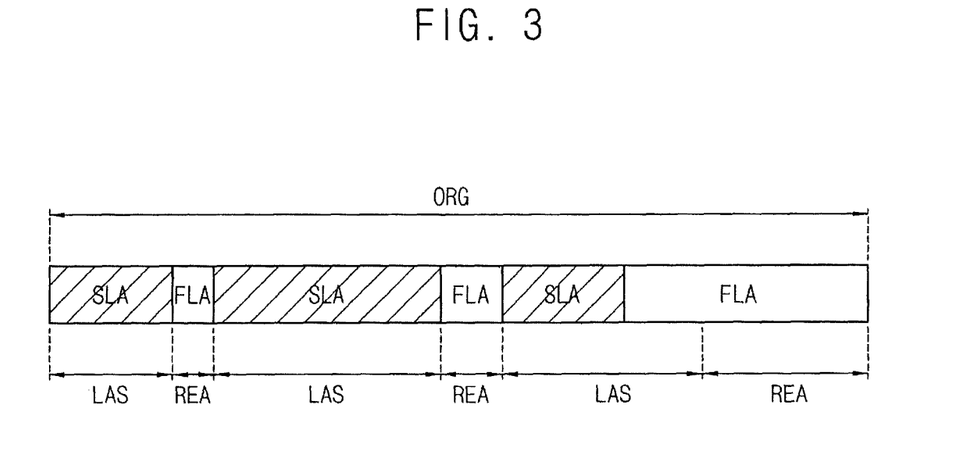
FIG. 3 is a diagram illustrating an example in which a save storage manager reduces a logical address space in the non-volatile memory system of FIG. 1.

FIG. 3 is a diagram illustrating an example in which a save storage manager reduces a logical address space in the non-volatile memory system of FIG. 1.

Referring to FIG. 3, when the NAND flash memory device 120 cannot physically support the original logical address space for the host device 140 (i.e., a first logical address space ORG) as the number of the run-time bad blocks is increased in the NAND flash memory 122, the save storage manager 160 may reduce the logical address space which the file system 142 is able to use from the first logical address space ORG to a second logical address space LAS by controlling the file system 142 to recall a portion of the first logical addresses FLA which the file system 142 does not use (i.e., the unused logical address space). That is, the save storage manager 160 may reduce the logical address space which the file system 142 is able to use from the first logical address space ORG to the second logical address space LAS by making a portion of the first logical addresses FLA in the first logical address space ORG (i.e., the recalled logical addresses REA) be no longer available to the host device 140 (i.e., the file system 142). For example, the file system 142 may prevent access to the recalled logical addresses REA by marking and managing the recalled logical addresses REA as an invalid space. In addition, the save storage manager 160 may inform the NAND flash memory device 120 of the reduction of the logical address space which the host device 140 (i.e., the file system 142) is able to use from the first logical address space ORG to the second logical address space LAS. Thus, the NAND flash memory device 120 may handle the run-time bad blocks in the NAND flash memory 122.

Figure 4:
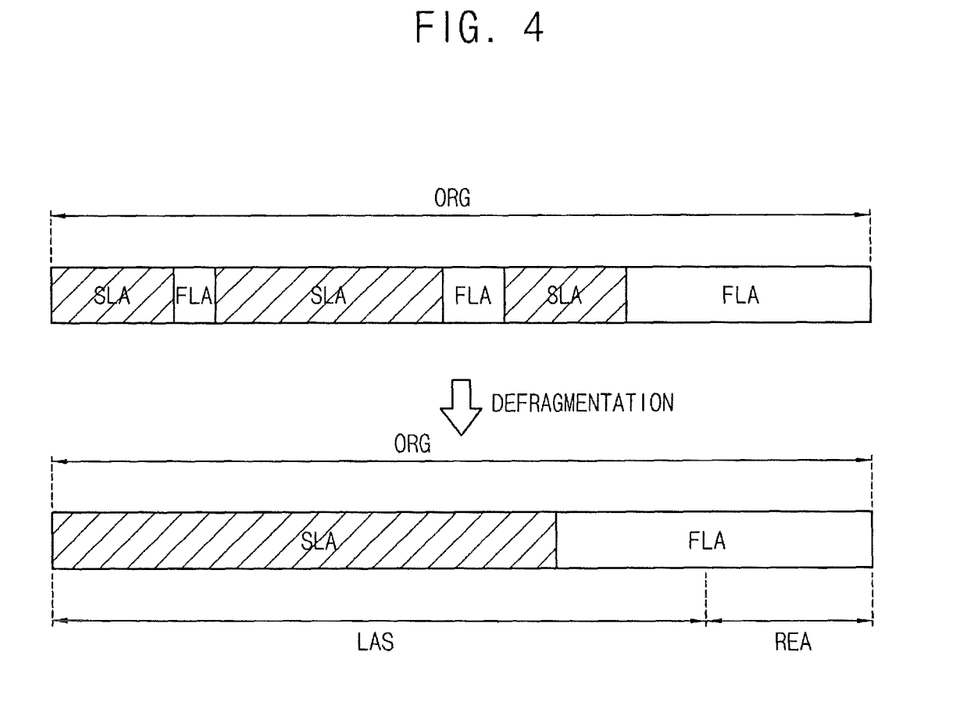
FIG. 4 is a diagram illustrating another example in which a save storage manager reduces a logical address space in the non-volatile memory system of FIG. 1.

FIG. 4 is a diagram illustrating another example in which a save storage manager reduces a logical address space in the non-volatile memory system of FIG. 1.

Referring to FIG. 4, when the NAND flash memory device 120 cannot physically support the original logical address space for the host device 140 (i.e., the first logical address space ORG) as the number of the run-time bad blocks is increased in the NAND flash memory 122, the save storage manager 160 may reduce the logical address space which the file system 142 is able to use from the first logical address space ORG to the second logical address space LAS by controlling the file system 142 to perform the defragmentation operation on the second logical addresses SLA which the file system 142 uses (i.e., the used logical address space) (i.e., indicated by DEFRAGMENTATION) to reallocate the first logical addresses FLA which the file system 142 does not use (i.e., the unused logical address space) to be consecutive and then by controlling the file system 142 to recall a portion of the first logical addresses FLA. That is, the save storage manager 160 may reduce the logical address space which the file system 142 is able to use from the first logical address space ORG to the second logical address space LAS by making a portion of the first logical addresses FLA in the first logical address space ORG (i.e., the recalled logical addresses REA) be no longer available to the host device 140 (i.e., the file system 142) after the first logical addresses FLA are consecutively reallocated (i.e., the first logical addresses FLA are consecutively collected) by the defragmentation operation. For example, the file system 142 may prevent access to the recalled logical addresses REA by marking and managing the recalled logical addresses REA as an invalid space. In addition, the save storage manager 160 may inform the NAND flash memory device 120 of the reduction of the logical address space which the host device 140 (i.e., the file system 142) is able to use from the first logical address space ORG to the second logical address space LAS. Thus, the NAND flash memory device 120 may handle the run-time bad blocks in the NAND flash memory 122.

Figure 5:
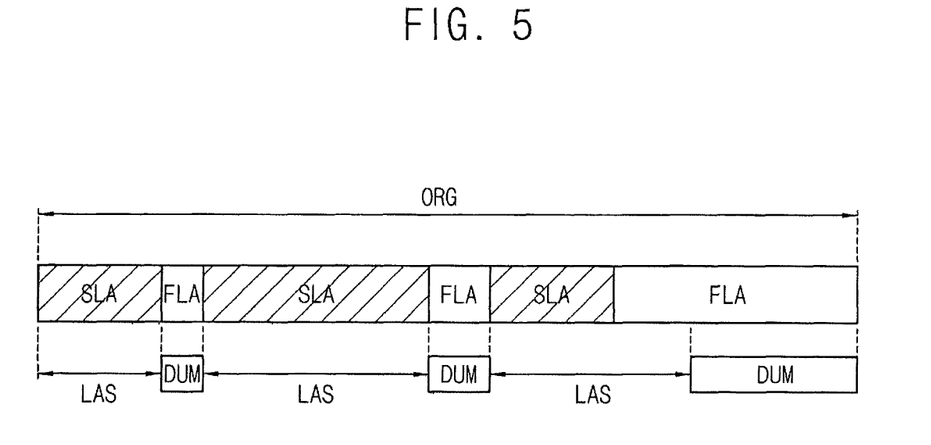
FIG. 5 is a diagram illustrating still another example in which a save storage manager reduces a logical address space in the non-volatile memory system of FIG. 1.

FIG. 5 is a diagram illustrating still another example in which a save storage manager reduces a logical address space in the non-volatile memory system of FIG. 1.

Referring to FIG. 5, when the NAND flash memory device 120 cannot physically support the original logical address space for the host device 140 (i.e., the first logical address space ORG) as the number of the run-time bad blocks is increased in the NAND flash memory 122, the save storage manager 160 may reduce the logical address space which the file system 142 is able to use from the first logical address space ORG to the second logical address space LAS by controlling the file system 142 to generate at least one dummy file DUM that occupies a portion of the first logical addresses FLA which the file system 142 does not use (i.e., the unused logical address space). That is, the save storage manager 160 may reduce the logical address space which the file system 142 is able to use from the first logical address space ORG to the second logical address space LAS by making a portion of the first logical addresses FLA in the first logical address space ORG be no longer available to the host device 140 (i.e., the file system 142). As described above, the save storage manager 160 may substantially reduce the logical address space which the file system 142 is able to use by allocating the dummy file DUM to the portion of the first logical addresses FLA which the file system 142 does not use (i.e., the unused logical address space). In addition, the save storage manager 160 may inform the NAND flash memory device 120 of the reduction of the logical address space which the host device 140 (i.e., the file system 142) is able to use from the first logical address space ORG to the second logical address space LAS. Thus, the NAND flash memory device 120 may handle the run-time bad blocks in the NAND flash memory 122.

Figure 6:
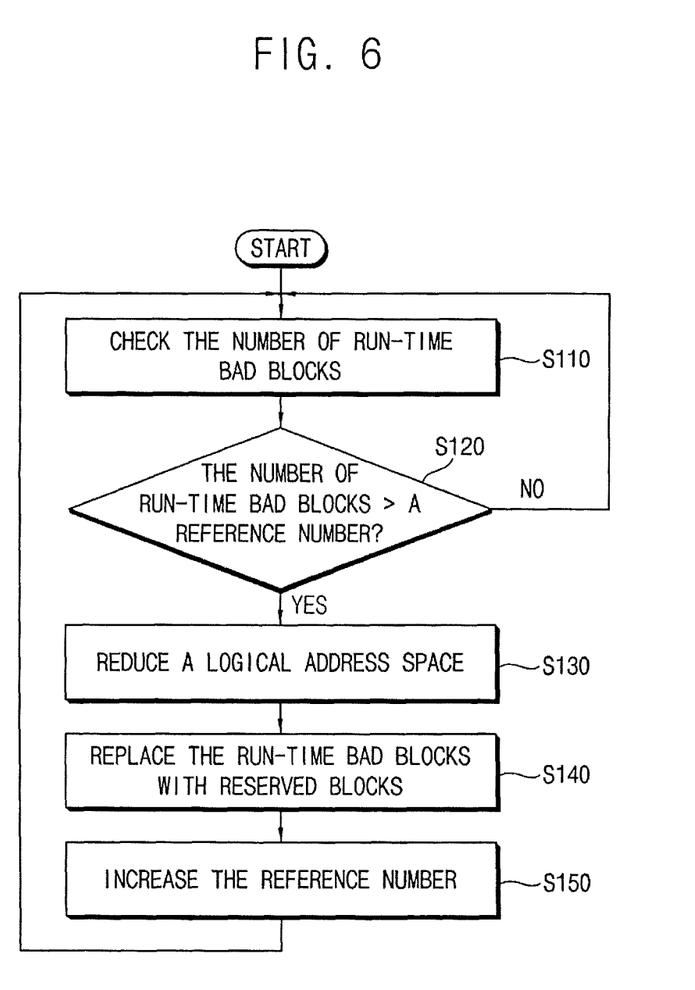
FIG. 6 is a flowchart illustrating an example in which a save storage manager determines whether to reduce a logical address space in the non-volatile memory system of FIG. 1.

FIG. 6 is a flowchart illustrating an example in which a save storage manager determines whether to reduce a logical address space in the non-volatile memory system of FIG. 1.

Referring to FIG. 6, it is illustrated that the save storage manager 160 reduces the logical address space which the file system 142 is able to use in the non-volatile memory system 100 including the NAND flash memory device 120 that employs a reserved block replacement technique that replaces the run-time bad blocks with the reserved blocks one to one. Here, the reserved blocks may be set when the NAND flash memory device 120 is manufactured. In addition, the reserved blocks may not be added as the NAND flash memory device 120 is used. In other words, N reserved blocks may be set when the NAND flash memory device 120 is manufactured, where N refers to an expected number of occurrences of the run-time bad blocks during an expected lifetime of the NAND flash memory device 120 (i.e., N reserved blocks are required for the expected lifetime of the NAND flash memory device 120), and the NAND flash memory device 120 may be discarded when the reserved blocks are exhausted. Specifically, the save storage manager 160 may check the number of the run-time bad blocks included in the NAND flash memory 122 (S110) and may check whether the number of the run-time bad blocks included in the NAND flash memory 122 is greater than the reference number (S120). Here, when the number of the run-time bad blocks included in the NAND flash memory 122 is not greater than the reference number, the save storage manager 160 may repeat the steps S110 and S120. On the other hand, when the number of the run-time bad blocks included in the NAND flash memory 122 is greater than the reference number, the save storage manager 160 may control the file system 142 to reduce the logical address space which the file system 142 is able to use (S130). Here, the save storage manager 160 may control the memory controller 124 to replace the run-time bad blocks with the reserved blocks in the NAND flash memory 122 (S140) by informing the NAND flash memory device 120 (i.e., the memory controller 124) of the reduction of the logical address space which the file system 142 is able to use. Subsequently, the save storage manager 160 may increase the reference number to be compared with the number of the run-time bad blocks (S150) and may repeat the steps S110, S120, S130, S140, and S150 based on the increased reference number. As described above, until the reserved blocks that are set when the NAND flash memory device 120 is manufactured are exhausted, the save storage manager 160 may control the file system 142 to reduce the logical address space which the file system 142 is able to use whenever the number of the run-time bad blocks included in the NAND flash memory 122 is greater than the reference number. Thus, when the reserved blocks that are set when the NAND flash memory device 120 is manufactured exist in the NAND flash memory 122, the save storage manager 160 may prevent the NAND flash memory device 120 from being unconditionally discarded based on determination that the NAND flash memory device 120 is unable to provide a sufficient logical address space to the host device 140. Since the method of FIG. 6 is an example, the present inventive concept is not limited thereto.

Figure 7:
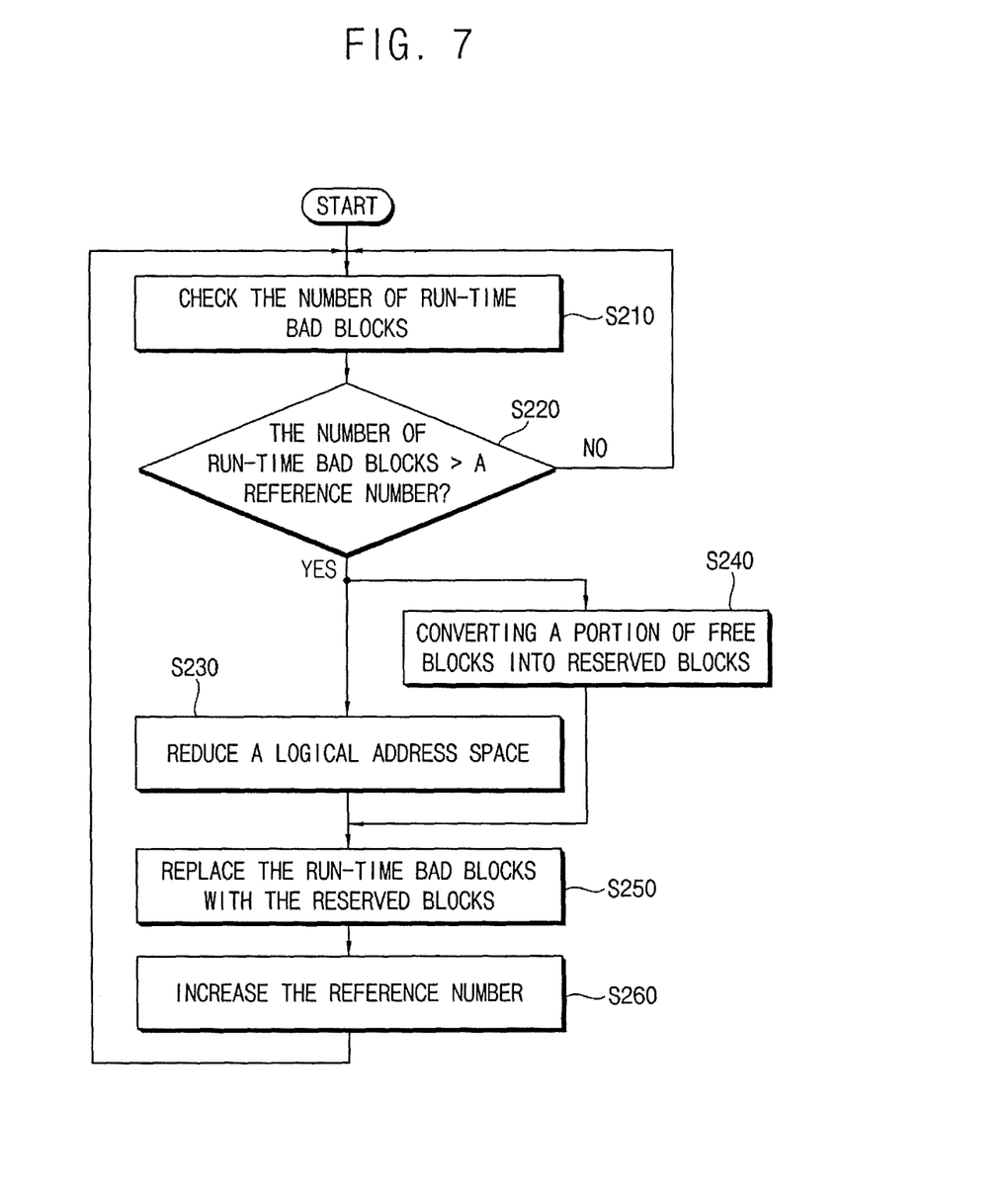
FIG. 7 is a flowchart illustrating another example in which a save storage manager determines whether to reduce a logical address space in the non-volatile memory system of FIG. 1.

FIG. 7 is a flowchart illustrating another example in which a save storage manager determines whether to reduce a logical address space in the non-volatile memory system of FIG. 1.

Referring to FIG. 7, it is illustrated that the save storage manager 160 reduces the logical address space which the file system 142 is able to use in the non-volatile memory system 100 including the NAND flash memory device 120 that employs a reserved block replacement technique that replaces the run-time bad blocks with the reserved blocks one to one. Here, the reserved blocks may be set when the NAND flash memory device 120 is manufactured. In addition, the reserved blocks may be added by converting a portion of the free blocks into the reserved blocks in the NAND flash memory 122 as the NAND flash memory device 120 is used. In other words, a small number of reserved blocks may be set when the NAND flash memory device 120 is manufactured, and a portion of the free blocks may be newly registered as the reserved blocks when the number of the reserved blocks is decreased (i.e., the reserved blocks replace the run-time bad blocks) during an operation of the NAND flash memory device 120. Specifically, the save storage manager 160 may check the number of the run-time bad blocks included in the NAND flash memory 122 (S210) and may check whether the number of the run-time bad blocks included in the NAND flash memory 122 is greater than the reference number (S220). Here, when the number of the run-time bad blocks included in the NAND flash memory 122 is not greater than the reference number, the save storage manager 160 may repeat the steps S210 and S220. On the other hand, when the number of the run-time bad blocks included in the NAND flash memory 122 is greater than the reference number, the save storage manager 160 may control the file system 142 to reduce the logical address space which the file system 142 is able to use (S230). Here, the save storage manager 160 may control the memory controller 124 to convert a portion of the free blocks into the reserved blocks (S240) and to replace the run-time bad blocks with the reserved blocks in the NAND flash memory 122 (S250) by informing the NAND flash memory device 120 (i.e., the memory controller 124) of the reduction of the logical address space which the file system 142 is able to use. Subsequently, the save storage manager 160 may increase the reference number to be compared with the number of the run-time bad blocks (S260) and may repeat the steps S210, S220, S230, S240, S250, and S260 based on the increased reference number. As described above, the save storage manager 160 may control the file system 142 to reduce the logical address space which the file system 142 is able to use whenever the number of the run-time bad blocks included in the NAND flash memory 122 is greater than the reference number. Thus, when the free blocks to be newly registered as the reserved blocks exist in the NAND flash memory 122, the save storage manager 160 may prevent the NAND flash memory device 120 from being unconditionally discarded based on determination that the NAND flash memory device 120 is unable to provide a sufficient logical address space to the host device 140. Since the method of FIG. 7 is an example, the present inventive concept is not limited thereto.

Figure 8:
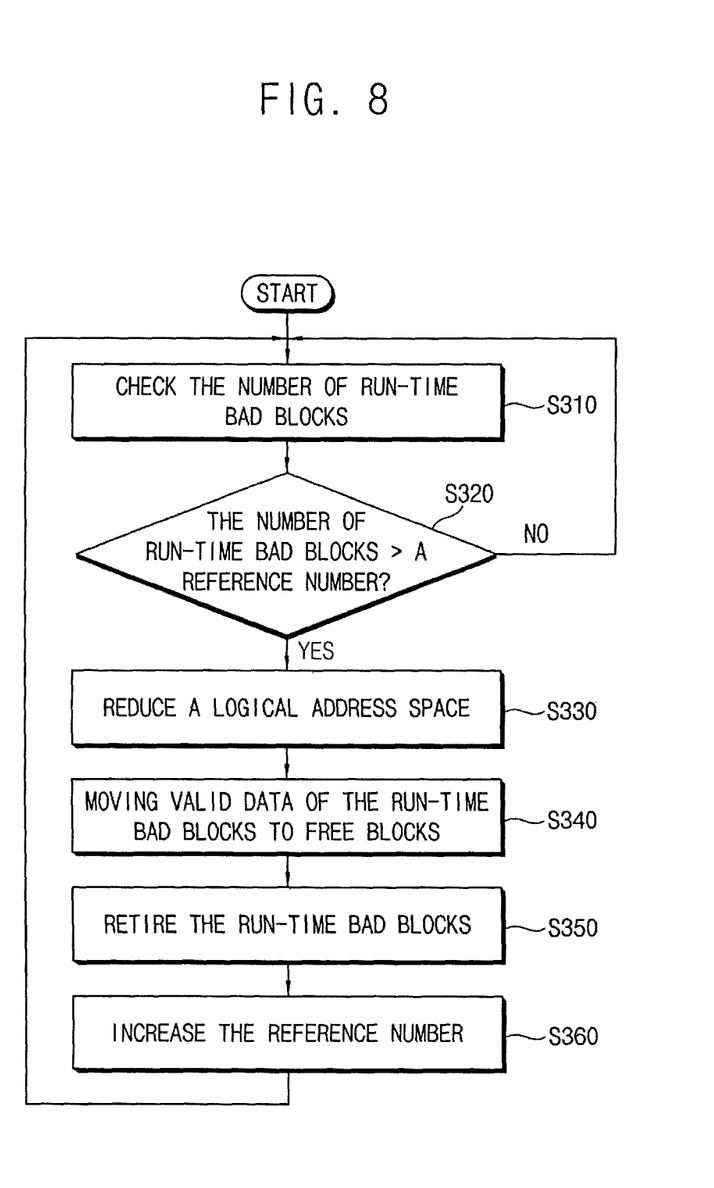
FIG. 8 is a flowchart illustrating still another example in which a save storage manager determines whether to reduce a logical address space in the non-volatile memory system of FIG. 1.

FIG. 8 is a flowchart illustrating still another example in which a save storage manager determines whether to reduce a logical address space in the non-volatile memory system of FIG. 1.

Referring to FIG. 8, it is illustrated that the save storage manager 160 reduces the logical address space which the file system 142 is able to use in the non-volatile memory system 100 including the NAND flash memory device 120 that employs a run-time bad block retirement technique that retires the run-time bad blocks (i.e., excludes the run-time bad blocks from use) after moving valid data of the run-time bad blocks to the free blocks. That is, the NAND flash memory device 120 does not employ a reserved block replacement technique that replaces the run-time bad blocks with the reserved blocks one to one. Specifically, the save storage manager 160 may check the number of the run-time bad blocks included in the NAND flash memory 122 (S310) and may check whether the number of the run-time bad blocks included in the NAND flash memory 122 is greater than the reference number (S320). Here, when the number of the run-time bad blocks included in the NAND flash memory 122 is not greater than the reference number, the save storage manager 160 may repeat the steps S310 and S320. On the other hand, when the number of the run-time bad blocks included in the NAND flash memory 122 is greater than the reference number, the save storage manager 160 may control the file system 142 to reduce the logical address space which the file system 142 is able to use (S330). Here, the save storage manager 160 may control the memory controller 124 to move (or, copy) the valid data of the run-time bad blocks to the free blocks (S340) and to retire the run-time bad blocks in the NAND flash memory 122 (S350) by informing the NAND flash memory device 120 (i.e., the memory controller 124) of the reduction of the logical address space which the file system 142 is able to use. Subsequently, the save storage manager 160 may increase the reference number to be compared with the number of the run-time bad blocks (S360) and may repeat the steps S310, S320, S330, S340, S350, and S360 based on the increased reference number. As described above, the save storage manager 160 may control the file system 142 to reduce the logical address space which the file system 142 is able to use whenever the number of the run-time bad blocks included in the NAND flash memory 122 is greater than the reference number. Thus, when the free blocks to which the valid data of the run-time bad blocks can be moved exist in the NAND flash memory 122, the save storage manager 160 may prevent the NAND flash memory device 120 from being unconditionally discarded based on determination that the NAND flash memory device 120 is unable to provide a sufficient logical address space to the host device 140. Since the method of FIG. 8 is an example, the present inventive concept is not limited thereto.

The present inventive concept may be applied to a non-volatile memory system including a host device and a NAND flash memory device. For example, the present inventive concept may be applied to an embedded multi media card (eMMC), a solid state drive (SSD), a secure digital (SD) card, a universal flash storage (UFS), a compact flash (CF) card, a memory stick, an extreme digital (XD) picture card, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A non-volatile memory system comprising:
    a NAND flash memory device including at least one NAND flash memory and a memory controller that controls the NAND flash memory;
    a host device including a file system and a host controller that receives a command from the file system to provide the command to the NAND flash memory device; and
    a save storage manager configured to monitor a number and location of run-time bad blocks in the NAND flash memory, to monitor a logical address use-state of the file system, and to reduce a logical address space which the file system is able to use as the number of the run-time bad blocks is increased,
    wherein the save storage manager controls the memory controller to replace the run-time bad blocks with reserved blocks in the NAND flash memory when the logical address space is reduced.

2. The non-volatile memory system of claim 1, wherein the save storage manager is included in the host controller or the memory controller, and wherein the save storage manager interacts with the file system and a flash translation layer included in the memory controller.

3. The non-volatile memory system of claim 1, wherein the save storage manager controls the file system to recall a portion of first logical addresses which the file system does not use to reduce the logical address space.

4. The non-volatile memory system of claim 3, wherein the save storage manager controls the file system to reallocate the first logical addresses to be consecutive by performing a defragmentation operation on second logical addresses which the file system uses before recalling the portion of the first logical addresses.

5. The non-volatile memory system of claim 1, wherein the save storage manager controls the file system to generate at least one dummy file that occupies a portion of first logical addresses which the file system does not use to reduce the logical address space.

6. The non-volatile memory system of claim 1, wherein the save storage manager controls the file system to reduce the logical address space whenever the number of the run-time bad blocks is greater than a reference number, and wherein the save storage manager increases the reference number as the NAND flash memory device is used.

7. The non-volatile memory system of claim 6, wherein the reserved blocks are set when the NAND flash memory device is manufactured, and wherein the reserved blocks are not added as the NAND flash memory device is used.

8. The non-volatile memory system of claim 6, wherein the reserved blocks are set when the NAND flash memory device is manufactured, and wherein the reserved blocks are added by converting a portion of free blocks into the reserved blocks in the NAND flash memory as the NAND flash memory device is used.

9. A non-volatile memory system comprising:
    a NAND flash memory device including at least one NAND flash memory and a memory controller that controls the NAND flash memory;
    a host device including a file system and a host controller that receives a command from the file system to provide the command to the NAND flash memory device; and
    a save storage manager configured to monitor a number and location of run-time bad blocks in the NAND flash memory, to monitor a logical address use-state of the file system, and to reduce a logical address space which the file system is able to use as the number of the run-time bad blocks is increased,
    wherein the save storage manager controls the memory controller to retire the run-time bad blocks in the NAND flash memory when the logical address space is reduced,
    wherein the save storage manager controls the memory controller to move valid data of the run-time bad blocks to free blocks before retiring the run-time bad blocks in the NAND flash memory,
    wherein the save storage manager controls the file system to reduce the logical address space whenever the number of the run-time bad blocks is greater than a reference number, and
    wherein the save storage manager increases the reference number as the NAND flash memory device is used.

* * * * *